(12) United States Patent
Kee et al.

(10) Patent No.: US 7,222,206 B2
(45) Date of Patent: May 22, 2007

(54) REMOVABLE MODULE FOR A PORTABLE ELECTRONIC DEVICE HAVING STAND-ALONE AND SYSTEM FUNCTIONALITY

(75) Inventors: Martin J. Kee, Sammamish, WA (US); Chao-Chi Chen, Sammamish, WA (US); Rod G. Fleck, Bellevue, WA (US); Craig W. O'Connell, Snohomish, WA (US); Stephen L. Perrin, Lake Forest Park, WA (US); Michael S. Clarke, Mercer Island, WA (US)

(73) Assignee: Vulcan Portals, Inc., Seattle, WA (US)

( * ) Notice: Subject to any disclaimer, the term of this patent is extended or adjusted under 35 U.S.C. 154(b) by 23 days.

(21) Appl. No.: 10/871,872

(22) Filed: Jun. 17, 2004

(65) Prior Publication Data

US 2005/0076088 A1 Apr. 7, 2005

Related U.S. Application Data

(60) Provisional application No. 60/504,165, filed on Sep. 18, 2003.

(51) Int. Cl.
*G06F 13/00* (2006.01)

(52) U.S. Cl. .................. 710/303; 710/301; 710/100

(58) Field of Classification Search ........ 710/301–304, 710/100; 713/323
See application file for complete search history.

(56) References Cited

U.S. PATENT DOCUMENTS

| | | | |
|---|---|---|---|
| 4,980,848 A | 12/1990 | Griffin et al. ............... | 364/708 |
| 5,612,520 A | 3/1997 | Toedtman et al. ........ | 200/16 D |
| 5,632,038 A | 5/1997 | Fuller ......................... | 395/750 |
| 5,710,607 A | 1/1998 | Iwamoto et al. ............ | 349/660 |
| 5,768,163 A | 6/1998 | Smith, II ............... | 364/705.01 |
| 5,768,164 A | 6/1998 | Hollon, Jr. ............. | 364/710.14 |

(Continued)

FOREIGN PATENT DOCUMENTS

JP 2003102530 A * 4/2003

(Continued)

OTHER PUBLICATIONS

"What is Notebook Computer?—A Word Definition from the Webopedia Computer Dictionary," last modified Jun. 16, 2004, available at www.webopedia.com.*

(Continued)

*Primary Examiner*—Mark H. Rinehart
*Assistant Examiner*—Kim T. Huynh
(74) *Attorney, Agent, or Firm*—Dorsey & Whitney, LLP

(57) ABSTRACT

A computer system has a removable module that contains a processor, other electrical components, and a battery. When the module has been removed from the computer system, the processor runs an application that interacts with the electrical components in the module to provide stand-alone functionality. When the removable module is in the computer system, the module is accessed by the computer system to cause the computer system to perform some of the functionality provided by the module. The functionality provided by the removable module includes receiving emails, displaying an appointment calendar, displaying a contacts listing, providing audio content, providing cellular telephone service, obtaining a video image, providing biometric identification information, sensing position, and displaying a television picture.

16 Claims, 5 Drawing Sheets

U.S. PATENT DOCUMENTS

| | | | |
|---|---|---|---|
| 5,796,577 A | 8/1998 | Ouchi et al. | 361/68.1 |
| 5,801,793 A | 9/1998 | Faris et al. | 349/5 |
| 6,089,459 A * | 7/2000 | Eisele et al. | 235/492 |
| 6,105,141 A | 8/2000 | Hanlon et al. | 713/323 |
| 6,115,755 A | 9/2000 | Krishan | 709/250 |
| 6,154,759 A | 11/2000 | Chou | 708/110 |
| 6,240,521 B1 | 5/2001 | Barber et al. | 713/323 |
| 6,262,883 B1 | 7/2001 | Kim | 361/680 |
| 6,412,075 B1 | 6/2002 | Klein | 713/322 |
| 6,525,932 B1 * | 2/2003 | Ohnishi et al. | 361/686 |
| 6,532,149 B2 | 3/2003 | Dhar et al. | 361/683 |
| 6,563,705 B1 | 5/2003 | Kuo | 361/687 |
| 6,628,653 B1 | 9/2003 | Salim | 370/389 |
| 6,681,324 B1 | 1/2004 | Anderson | 713/1 |
| 6,721,420 B1 | 4/2004 | Kubo et al. | 379/433.13 |
| 6,778,383 B2 | 8/2004 | Ho | 361/681 |
| 6,798,647 B2 * | 9/2004 | Dickie | 361/683 |
| 6,948,021 B2 * | 9/2005 | Derrico et al. | 710/302 |
| 6,959,328 B1 | 10/2005 | Gillaspy et al. | 709/220 |
| 2002/0000997 A1 | 1/2002 | Selli et al. | 345/659 |
| 2002/0026494 A1 | 2/2002 | Suzuki | 709/214 |
| 2002/0065564 A1 | 5/2002 | Sheriff et al. | 700/11 |
| 2002/0086719 A1 | 7/2002 | Kedia et al. | 455/574 |
| 2002/0087225 A1 | 7/2002 | Howard | 700/94 |
| 2002/0129288 A1 | 9/2002 | Loh et al. | 713/320 |
| 2002/0178390 A1 | 11/2002 | Lee | 713/320 |
| 2002/0194414 A1 * | 12/2002 | Bateman et al. | 710/303 |
| 2002/0196599 A1 | 12/2002 | Misawa | 361/683 |
| 2003/0041206 A1 * | 2/2003 | Dickie | 710/303 |
| 2003/0054804 A1 * | 3/2003 | Brandes et al. | 455/414 |
| 2003/0065934 A1 * | 4/2003 | Angelo et al. | 713/200 |
| 2003/0068034 A1 | 4/2003 | Silvester | 379/433.12 |
| 2003/0080952 A1 | 5/2003 | Chitturi et al. | 345/204 |
| 2003/0115495 A1 | 6/2003 | Rawson, III | 713/324 |
| 2003/0126335 A1 * | 7/2003 | Silvester | 710/303 |
| 2003/0148742 A1 | 8/2003 | Kim | 455/90 |
| 2003/0207686 A1 | 11/2003 | Ramanna et al. | 455/435.1 |
| 2003/0211888 A1 | 11/2003 | Wolinsky | 463/41 |
| 2004/0019724 A1 * | 1/2004 | Singleton et al. | 710/303 |
| 2004/0163004 A1 | 8/2004 | Kardach et al. | 713/323 |
| 2004/0181610 A1 | 9/2004 | Walker | 709/250 |
| 2004/0261072 A1 | 12/2004 | Herle | 717/171 |
| 2004/0268004 A1 * | 12/2004 | Oakley | 710/303 |
| 2005/0066209 A1 | 3/2005 | Kee et al. | 713/323 |
| 2005/0073515 A1 | 4/2005 | Kee et al. | 345/204 |
| 2005/0076088 A1 | 4/2005 | Kee et al. | 709/206 |
| 2005/0237702 A1 | 10/2005 | Kee et al. | 361/681 |

FOREIGN PATENT DOCUMENTS

JP    2003180431 A  *  7/2003

OTHER PUBLICATIONS

Fuller, A. et al., "Auxiliary Displays For Mobile PCs", Microsoft Windows Hardware & Driver Central, Microsoft Corporation, 2004, pp. 1-30.

Thakkar, S.S. et al., "Mobile Internet PC 2004-Delivering the Vision", Intel, Intel Developer Forum, Feb. 2003. pp. 1-36.

* cited by examiner

REMOVABLE MODULE FOR A PORTABLE ELECTRONIC DEVICE HAVING STAND-ALONE AND SYSTEM FUNCTIONALITY

CROSS-REFERENCE TO RELATED APPLICATIONS

The present application claims the benefit of the filing date of U.S. Provisional Application No. 60/504,165 entitled SOFTWARE AND HARDWARE FEATURES FOR MINI-PC, filed Sep. 18, 2003, which is incorporated herein by reference.

FIELD

This relates generally to processor-based systems, and more particularly to an electronic device having a removable module that can be used either as a part of the electronic device or by itself in a stand-alone manner.

BACKGROUND

Electronic devices such as personal computers have become indispensable tools for business and personal use. In addition to a wide variety of applications that may be run on a personal computer, personal computers also serve as communications terminals for access to the Internet. Portable personal computers, generally known as "laptop" or "notebook" computers, have become increasingly popular because their portability allows access to the wide variety of computer applications when traveling, such as on airplanes. However, although continued progress has been made in reducing the weight and bulk of portable personal computers, they are still too large and heavy to be easily carried in many instances.

The functionality of portable personal computers is also sometimes limited by the number of hardware components included in the computers. However, the functionality of such computers can be increased by the use of removable modules that can be received by the computers. For example, many portable personal computers have an extra bay that can receive a floppy disk drive, a second hard disk drive, a CD-ROM or DVD drive, an extra battery, etc. Similarly, a portable personal computer can be provided with a wireless receiver, a global positioning system ("GPS") receiver, a TV tuner, etc. by inserting an appropriate card into an externally accessible slot. Although these modules can improve the functionality of portable personal computers, they cannot be used, and thus perform no useful function, when they are removed from the computers.

Another limitation of conventional personal computers is the inability to use them to instantly review information, such as to look up a phone number or an address. Before the computer can be used to access the information, the computer must be turned on and then "boot up" by running an initialization sequence and loading an operating system. This process can take a considerable period of time. Furthermore, it is generally necessary to open up the portable computer to turn it on and access the information. It can be difficult to perform this function under certain circumstances, such as when driving a car or sitting in the small confines of an aircraft seat.

Various devices have been developed to address these and other limitations of conventional portable personal computers, such as laptop and notebook computers. The most prevalent of these devices is the personal digital assistant, or "PDA," which provides some of the functionality of a portable personal computer without the size and weight of such computers. This limited functionality generally includes an appointment calendar, an address or contact list, a task list and email capability when coupled to a suitable communication link, which may be wireless. In some cases, a cellular telephone is built into the PDA, and various applications having limited functionality, such as spreadsheets and word processors, are also available. PDAs offer a convenient means of using the limited functionality that they offer because it is not necessary to open a cover to view their display screens. Furthermore, there is minimal delay in accessing PDAs because their operating system remains stored in random access memory when the PDA is turned off so it may be executed by an internal processor as soon as power is applied to the processor. It is therefore not necessary to wait for a boot sequence to execute and an operating system to be loaded. When the PDA is turned off, power continues to be applied only to essential circuitry like a volatile random access memory, thus preserving the useful life of an internal battery before recharge is needed.

Although PDAs have been very successful in making limited computer functions conveniently available to users, they do not provide all of the functionality and ease of use of a portable personal computer. As a result, business travelers and others often buy and transport with them a PDA and a personal computer.

The usefulness of a portable personal computer can often be enhanced by coupling the computer to other devices. For example, a portable personal computer can be provided with wireless communication capability by coupling the computer to a cellular telephone. Although communications capability can be provided by other means, such as by coupling the personal computer to a wireless adapter, a cellular telephone is often indispensable for voice communications. Therefore, travelers frequently buy and transport with them a cellular telephone for use in voice communications and to enhance the utility of their portable personal computers.

Other electronic devices are also frequent travel companions for business and personal use. For example, a digital camera is useful in both business and personal travel. By coupling a digital camera to a portable personal computer, image files stored in the camera can be downloaded to the computer for storage. Images from the stored image files can then be edited on the computer using commercially available photo editing applications. Video cameras are sometimes built in to portable personal computers, and they could be used to capture digital images. However, the weight and bulk of portable personal computers makes them difficult to use and carry for the purpose of taking photographs. As a result, a person traveling with a personal computer who desires to take photographs is likely to bring with him or her a stand-alone digital camera.

Audio players, usually employing an MP3 decoding and playback capability, are also frequent companions of business and personal travelers. While a personal computer can store and play back MP3 and other audio files, it is often not practical to carry a portable personal computer when engaging in some activities. For example, while recreational runners frequently carry MP3 players with them while running so they can listen to music, it would be impractical to carry a personal computer while running. As a result, it is often desirable to have an audio player even if a portable personal computer is available. The same considerations apply to portable DVD viewers.

In summary, there are a large number of very useful electronic devices that can be advantageously used with portable personal computers. Although these devices could be built into portable personal computers, doing so would greatly detract from the practical utility of such devices. Thus, one sees or can expect to see "well-wired" business and personal travelers carrying most or all of a portable personal computer, a PDA, a cellular telephone, a digital camera, a music player, a DVD viewer, and whatever new electronic device that is introduced in the future. The difficulty carrying all of these devices, as well as the cost of buying them, threatens to limit their usefulness.

There is therefore a need to take advantage of the usefulness of electronic devices that can be used with a portable personal computer without the expense and transportation difficulties of obtaining a large number of such devices and without the difficulty of use that would be created by using them as part of a portable personal computer.

SUMMARY

One preferred aspect provides an electronic processor-based device, such as a portable personal computer, that is adapted to physically and electrically receive a module that provides the device with additional functionality. The module can provide the device with all or some of the following functionality: cellular telephone, personal digital assistant ("PDA"), wireless communications through WiFi, Bluetooth or other protocol, global positioning system ("GPS") to provide position information, digital camera, audio music player, DVD viewer, TV tuner, satellite radio, bio-identification, or other function that is useful to have with the electronic device. In addition to being functional with the electronic device, the module is also functional apart from the electronic device and thus usable in a stand-alone manner. Therefore, the module can be used without the weight, bulk and possibly limited power consumption of the electronic device. The module has its own processor and associated electronic components, and it is powered with its own battery, which may be recharged by the electronic device, to allow it to be used in a stand-alone manner.

DETAILED DESCRIPTION

Figure 1:
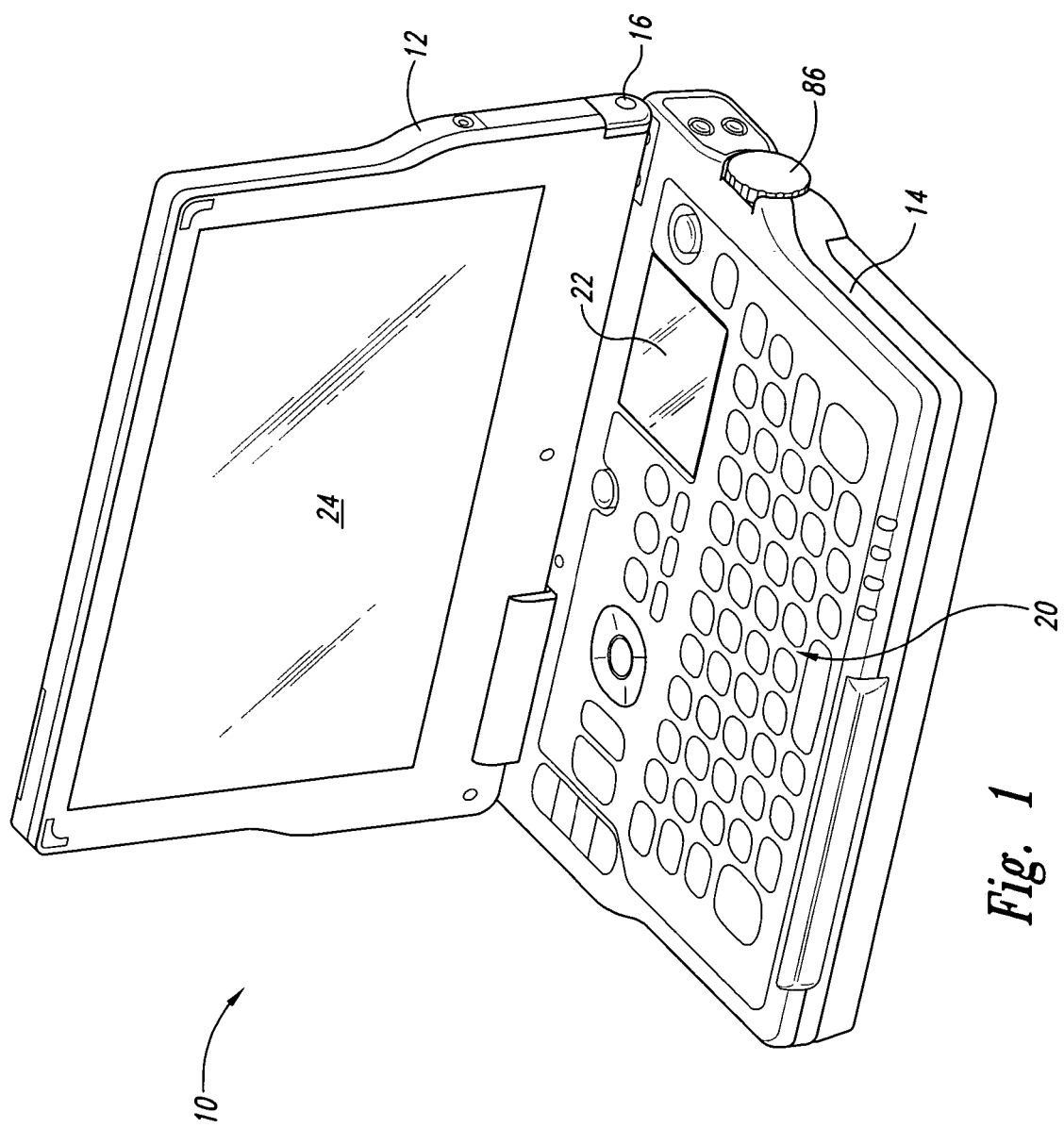
FIG. 1 is a front isometric view of a computer system according to one embodiment showing a display lid in its open view.

A computer system 10 according to one embodiment is shown in FIG. 1. The computer system 10 has a "clam shell"structure formed by a lid 12 pivotally mounted to a chassis 14 at one edge 16. A keyboard 20 covers substantially the entire inner surface of the chassis 14 except for an area occupied by a touchpad 22 pointing device. A main display 24 covers substantially the entire inner surface of the lid 12. The computer system 10 is turned on by pressing an appropriate key on the keyboard 20, and the keyboard 20 is used to enter alphanumeric data. Although the computer system 10 may be substantially the size of a conventional notebook computer, i.e., on the order of 250 mm by 300 mm in plan form, it is preferably only slightly larger than a conventional PDA, i.e., on the order of 100 mm by 150 mm with a thickness of about 25mm.

Figure 2:
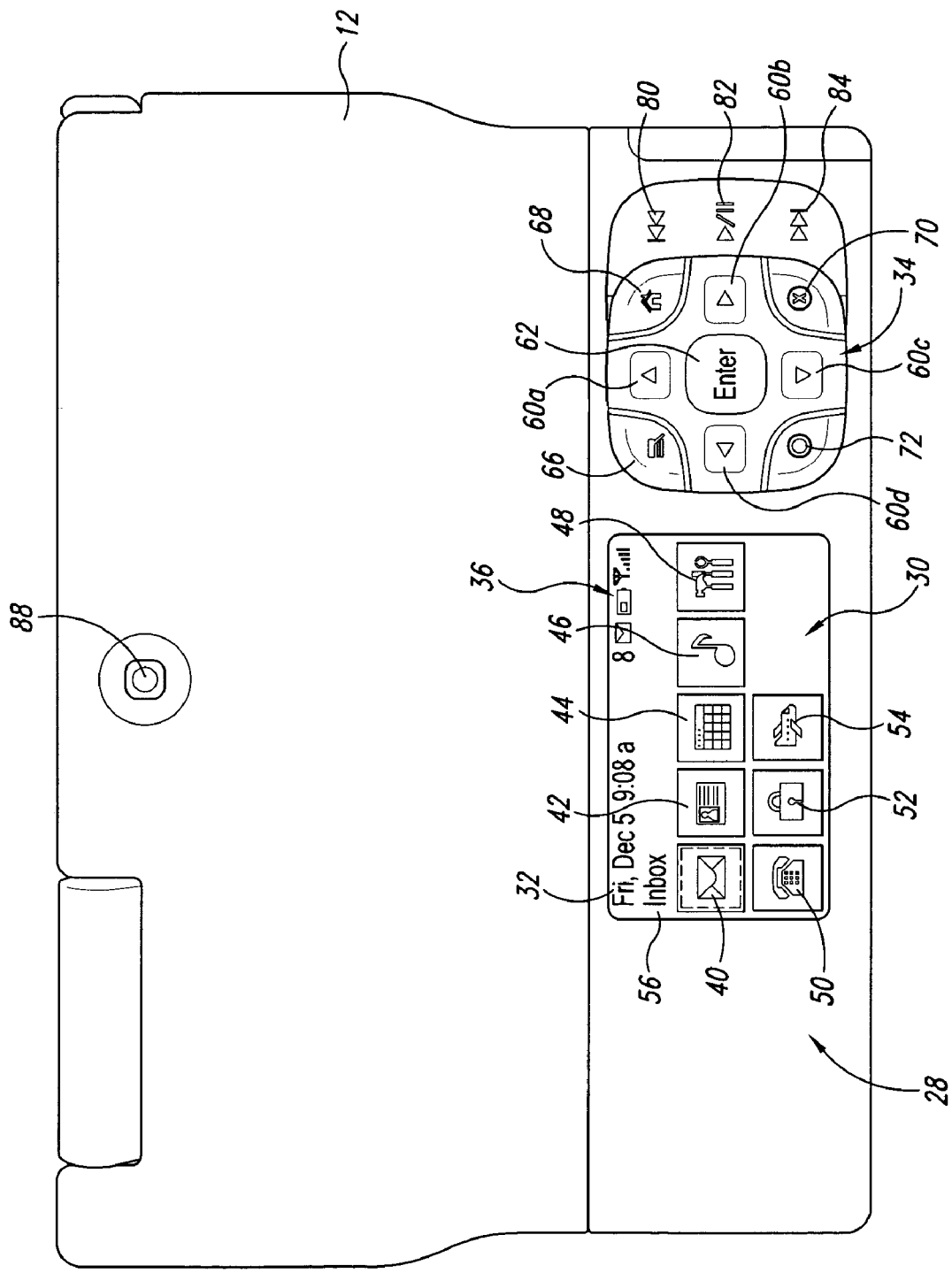
FIG. 2 is a top plan view of the surface of the display lid of the computer system of FIG. 1.

With reference to FIG. 2, the outer surface of the lid 12 includes a removable module 28 that includes an auxiliary touch-screen display 30 and a membrane keypad 34. Shown on the display 30 are the current date and time 32, status icons 36, including status indicators showing the number of new email messages, the charge status of an internal battery, and the signal strength for an internal cell phone application. The touch-screen display 30 also includes an icon 40 for accessing the "Inbox" of an email application, an icon 42 for accessing a contacts application, an icon 44 for accessing an appointment calendar application, an icon 46 for accessing an audio player application, an icon 48 for accessing an voice memo application, an icon 50 for accessing a modem, an application 52 for locking the system, and an icon 54 for turning off wireless functionality when flying in an airplane. The functions represented by each of these icons 40–54 can be selected by pressing the icon on the touch-screen display 30. The particular icon 40–54 that is selected is shown in the display 30 at 56.

The keypad 34 includes directional keys 60*a*–*d* that perform different functions depending on which application is being accessed. The directional keys 60*a*–*d* are used to move a cursor up, to the right, down, and to the left, respectively, when alphanumeric text is shown in the touch-screen display 30. When the audio player application is active, the directional keys 60*a,c* are used to increase or decrease the volume, respectively, and the directional keys 60*b,d* are used for respectively moving forwardly or a rearwardly in an audio selection. The directional keys 60*a*–*d* surround an Enter key 62 that is used in a conventional manner.

The keypad 34 also includes a menu key 66 that causes menu items to be shown in the touch-screen display 30, a home key 68 that causes the display 30 to show the icons 40–54 illustrated in FIG. 2, an "Esc" or cancel key 70 that is used to cancel a current selection, and an Enter key 72 that essentially performs the same function as the Enter key 62. The key 72 and key 70 can also be used as "call" and "end call" buttons, respectively, when the module is used to implement telephone applications.

Also included with the keypad 34 are three audio control keys that are used when the audio playback application is active. These audio control keys are a key 80 for selecting a previous track, a play/pause key 82, and a next track key 84, which are used in a conventional manner.

With further reference to FIGS. 1 and 2, the computer system 10 also includes a side wheel 86 (shown in FIG. 1) mounted on the side of the computer system 10 that can be rotated in up or down directions by manipulating the wheel 86 with a finger. The side wheel 86 allows a user to scroll through menu items shown on the touch-screen display 30 when either the menu key 66 or an application running on the computer system 10 displays a menu. The side wheel 86 can also be used for other functions that are supported by applications running on the computer system when the computer system is open and powered, such as a "zoom" control in certain applications to change the scale at which an item is shown on the main display 24 or the touch-screen display 30. Finally, the side wheel 86 may be used to configure the computer system 10, such as to adjust the contrast of the main display 24 and the touch-screen display 30, to toggle the touch-screen display 30 on and off, to control the volume of internal speakers, etc. The side wheel 86 can also be pressed inwardly along the axis of rotation to generate a key click, which is generally used to perform an enter or select function. It will be understood that other user input devices may be substituted for the keyboard 20, main display 24, side wheel 86 and other components of the computer system 10. Similarly, other user input devices may be substituted for the keypad 34 and auxiliary display 30 in the removable module 28.

Figure 3:
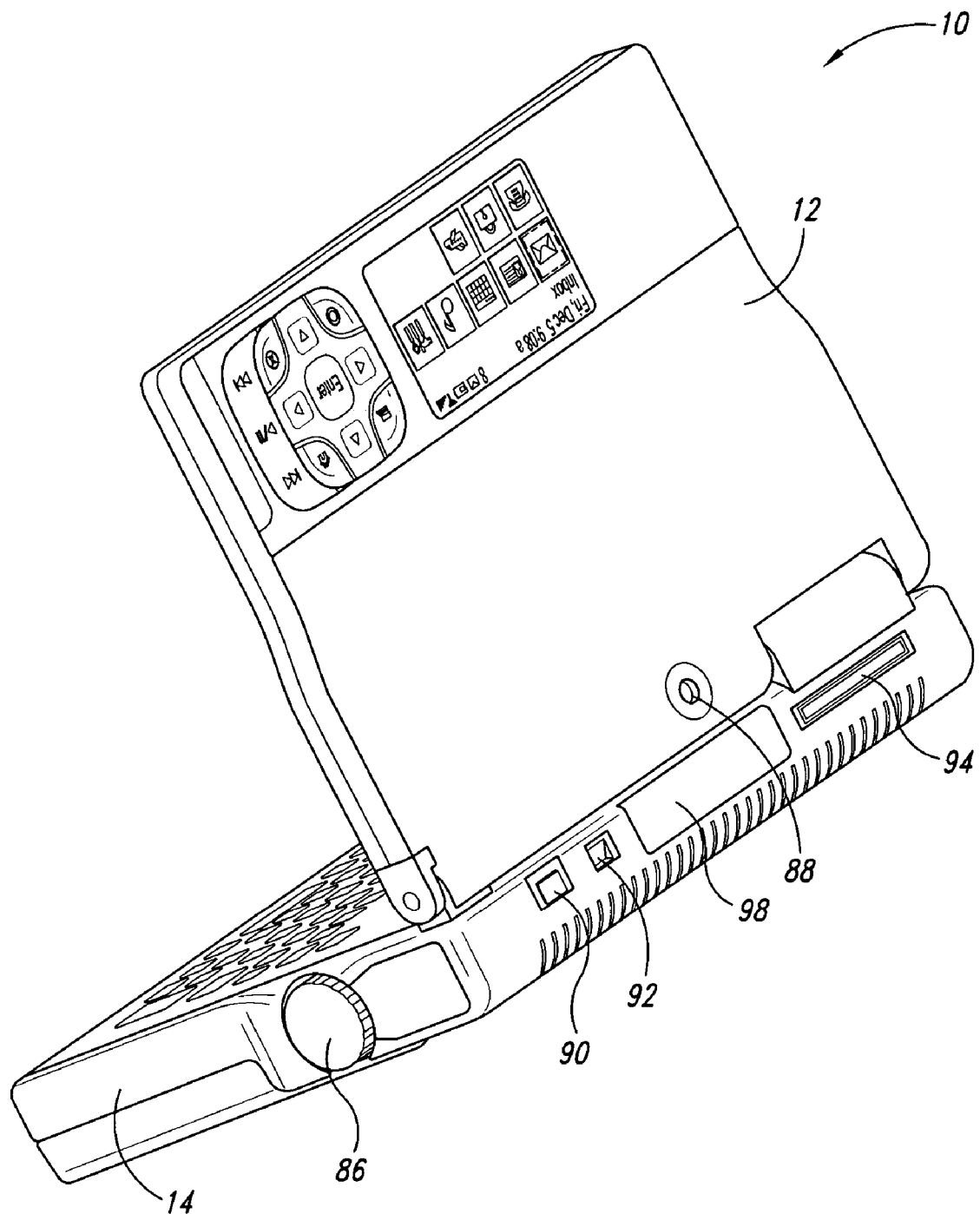
FIG. 3 is a rear isometric view of a rear panel of the computer system of FIG. 1.

As shown in FIG. 3, the computer system 10 includes most of the usual connectors for connecting to external devices. More specifically, the computer system 10 includes a conventional universal serial bus ("USB") port 90, a DC power input jack 92, and a docking connector port 94. The various communication ports can be used to provide communication between an external device and the computer system 10. Many such peripheral devices are well known, for example, printers, digital cameras, scanners, external disk drives, and the like. Although not shown in FIG. 3, the computer system also includes an Ethernet port, a modem port, a serial port, etc. In one embodiment, the rear portion of the computer system 10 further includes an antenna window 98 for wireless communication. The computer system 10 can be equipped with wireless capability using IEEE 802.11 WiFi, Bluetooth, or other wireless communication protocols. The antenna 98 can be utilized for transmission as well as reception of wireless signals. The computer system 10 also includes an internal battery (not shown in FIGS. 1–3) as well as in internal AC powered battery charger (not shown).

The removable module 28 may be used to provide access to the applications corresponding to the icons 40–54 when either the lid 12 is closed and the computer system 10 is turned off or the module 28 is entirely removed from the computer system 10. Also, the computer system 10 preferably may be placed in a quiescent low power mode. When the lid 12 is closed and the computer system 10 is in the low power mode, the removable module 28 may also be used to provide access to the applications corresponding to the icons 40–54 computer system. As explained in greater detail below with reference to FIG. 4, the applications corresponding to the icons 40–54 are executed by a processor in the removable module 28. Therefore, the module 28 can be used to perform key tasks like checking emails, viewing contact and calendar information, recording voice memos, and playing music files when the computer system 10 is turned off or the module 28 is removed from the computer system 10. The module 28 may thus be used like a PDA without the need to boot up the computer system 10 and load its operating system, and without the need to open the lid 12 of the computer system 10. When the computer system 10 is turned on, and the removable module 28 is physically and electrically integrated with the computer system 10 as shown in FIGS. 1 and 2, a processor in the computer system chassis 14 can access the functionality provided by the removable module 28 through the keyboard 20 and the main display 24. Additionally, the information provided by the module 28 is synchronized to the information stored in the computer system 10. The computer system 10 may be configured to automatically transition from the power saving mode to an active normal operating mode when the module 28 is received by the chassis 14.

The hardware architecture of the computer system 10 and the removable module 28 will now be explained with reference to the block diagram of FIG. 4. However, it will be understood that other hardware configurations may alternatively be used. The hardware of the computer system 10 provides a suitable computing environment for the software architecture, including operating systems and applications. The chassis 14 of the computer system 10 includes a computer system processor 100 coupled to a processor bus 104. The processor bus 104 preferably includes a command/status bus, an address bus and a data bus. Although the computer system processor 100 preferably includes a level 1 ("L1") cache, the computer system 10 includes a level 2 ("L2") cache 108, which is coupled to the computer system processor 100 through the processor bus 104. The L2 cache 108 includes the usual tag and data memories, which are normally implemented using static random access memory ("SRAM") devices.

The computer system processor 100 accesses a number of computer components through a system controller 120, which is also connected to the processor bus 104. The system controller 120 includes a memory controller 124 that is coupled through a memory bus 126 to a system memory 128. The memory bus 126 includes a command bus through which memory commands are passed to the system memory 128, an address bus specifying a location in memory that is being accessed by a read or write command, and a bi-directional data bus through which write data are passed to the system memory 128 and read data are passed from the system memory 128. A suitable random access memory device, typically a dynamic random access memory ("DRAM") device, is used as the system memory 128.

The system controller 120 also includes a graphics port that is coupled to a graphics processor 130. The graphics processor 130 is, in turn, coupled to the main display 24, which may be a liquid crystal display ("LCD"), but may also be an organic light emitting diode ("OLED") display, a plasma display, a field emission display ("FED"), or some other type of display.

The system controller 120 also serves as a bus bridge between the processor bus 104 and a peripheral bus 140, which may be a peripheral component interconnect ("PCI") bus. The peripheral bus 140 is coupled to a FAX/modem 142 and a disk drive 144 accessing a hard disk 146, which together provide non-volatile storage of computer readable instructions, program modules, data structures, and other data. However, other types of non-volatile storage may also be used, such as flash memory cards, recordable CD-ROM and DVD disks, Bernoulli cartridges, smart cards, to name a few. The peripheral bus 140 is also coupled to a network interface 154 that is used to provide communications through a suitable local area network ("LAN"), such as an Ethernet network. The network interface 154 may also provide access to a wireless network, such as 802.11 WiFi, Bluetooth, cellular using TDMA, FDMA and/or CDMA radios, or some other wireless communication links. As part of the user interface for the computer system 10, the peripheral bus 140 is also coupled to a pointing device 156, such as an external mouse and the touchpad 22, and a keyboard interface 158, which is coupled to the keyboard 20. The peripheral bus 140 is coupled to a read only memory ("ROM") device 160, which stores a basic input/output system ("BIOS") program that includes a boot sequence, which is executed by the high power processor 100 at power-up. The BIOS program stored in the ROM device 160 will be described in greater detail with reference to FIG. 5. The BIOS program is preferably shadowed by being transferred from the ROM device 160 to the system memory 128 as part of the boot sequence, and it is then executed by the high power processor 100 from the system memory 128.

The peripheral bus 140 is also coupled to an audio interface 162 that is connected to an internal microphone 164 and a pair of speakers 166*a,b*. The audio interface 162 includes a digital-to-analog converter having a pair of outputs that are coupled to the speakers 166*a,b*. The audio interface 162 also includes a sampler producing analog samples of a signal from the microphone 164, and an analog-to-digital converter, which digitizes the analog samples and passes the digital sample data to the peripheral bus 140.

The processor bus 104 in the chassis 14 of the computer system 10 is connected to a processor bus 168 in the removable module. Also connected to the processor bus 168 is a module processor 170. The module processor 170 is used to support the functionality that is available using the removable module 28. The processor 170 is coupled through the processor bus 168 to a module system controller 180, which also includes a memory controller 184. The memory controller 184 is coupled to a system memory 186, which may be a DRAM device, through a memory bus 188. The system memory 186 may have a capacity that is smaller than the capacity of the system memory 128, and it may operate at a substantially slower speed. The system memory 186 is accessed by the module processor 170, although in some embodiments it may also be accessed by the computer system processor 100. The system controller 184 is coupled to a peripheral bus 190, which may be a PCI bus, and an ISA bus or some other type of bus. The system controller 184 and the peripheral bus 190 couple the module processor 170 to the side wheel 86, a display interface 194 for the touch-screen display 30, and a keypad interface 196, which is coupled to the membrane keypad 34. In an embodiment, the peripheral bus 190 is also coupled to a ROM 198 that stores a BIOS program and operating system for the module processor 170. The ROM 198 may also store firmware for the applications used by the removable module 28 in its stand-alone mode. These applications are run on the module processor 170, which, in conjunction with the system controller 180, system memory 186 and components coupled to the peripheral bus 190, are used to support the functionality of the removable module 28. A miniature disk drive 200 is also coupled to the peripheral bus 190 for accessing a hard disk 206, which provides non-volatile storage of at least the data that is used by the removable module 28 in its stand-alone mode. Such data would include, for example, email messages, a contacts list, an appointment calendar, an MP3 or other audio files. The hard disk 206 may also store computer readable instructions, program modules, data structures, and other data if they are not stored in the ROM 198. Although a disk drive 200 and hard disk 206 are used as the high capacity, non-volatile storage means in the embodiment shown in FIG. 4, it will be understood that other types of non-volatile storage may also be used.

Figure 4:
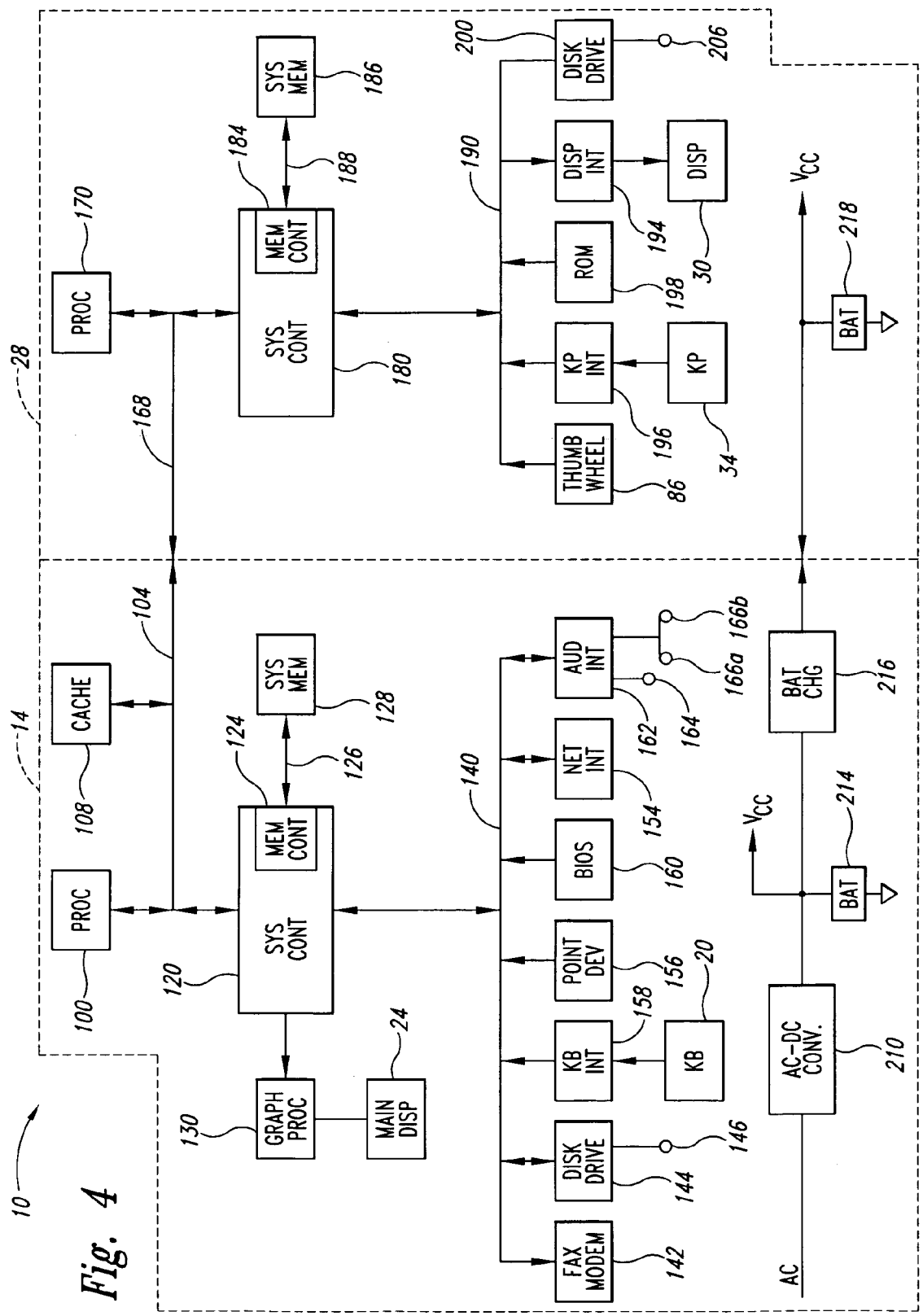
FIG. 4 is a hardware sysytem block diagram of one embodiment of the computer system of FIG. 1.

Although the chassis 14 of the computer system 10 is shown in FIG. 4 as being coupled to the removable module 28 through interconnected processor buses 104, 168, it will be understood that they may be coupled to each other by other means. For example, the processor buses 104, 168 may be isolated from each other, and the chassis 14 and removable module 28 may be coupled to each other through a communications link (not shown).

The computer system 10 also includes an AC to DC converter 210 that generates a DC voltage for supplying power to the electrical components in the computer system and for charging a battery 214 in the chassis 14 of the computer system 10. When the converter 210 is not connected to a source of AC power, the battery 214 supplies power to the electrical components in the computer system 10. DC power from either the converter 210 or the battery 214 is also applied to a battery charger 216 that generates a controlled DC voltage for charging a battery 218 in the removable module 28. When the computer system 10 is coupled to a source of AC power, the converter 210 supplies power to the battery charger 216, which, in turn, supplies power to the removable module 28. When the removable module 28 is present in the chassis 14 of the computer system 10, the module 28 receives power from the battery 218. When the computer system 10 is not connected to a source of AC power but the module 28 has not been removed from the chassis 14, the module 28 can receive power from either the battery 218 or the battery 214 in the chassis 14 through the battery charger 216.

In operation, the computer system processor 100 boots up from the system memory 128 after the boot sequence and the operating system have been transferred to the memory 128. The module processor 170 boots up by executing a BIOS program stored in the system memory 186 after the BIOS program stored in the ROM 198 has been shadowed to the memory 186. The operating system for the module processor 170 is also transferred from the ROM 198 to the system memory 186. However, the BIOS program and the operating system for the module processor 170 may be transferred to the system memory 186 by other means. For example, the BIOS program and operating system may be stored in the hard disk 146 and transferred to the system memory 186 by the high power processor 100. Once the operating systems have been loaded into the system memories 128, 186, the computer system 10, including the removable module 28, are operational.

When the computer system 10 has been turned off, power is removed from the electrical components in the chassis 14 of the computer system 10. However, in some embodiments, power may still be applied to at least some components of the removable module 28, including the module processor 170 and the system memory 186, so the module 28 can provide virtually instant access to the features of the removable module 28. The user interface to these features is then provided by the touch-screen display 30, the keypad 34, and the side wheel 86. However, in some embodiments, the module processor 170 has the ability to "wake-up" or re-power the computer system processor 100 to access components in the computer system 10.

Although the relatively low performance of the processor 170 and the relatively small capacity and slow speed of the system memory 186 do not provide nearly the processing capabilities of the computer system processor 100 and system memory 128, they provide adequate processing capability to perform the functions accessed through the removable module 28. As explained above, these functions include email, access to a contacts listing, access to an appointment calendar, and playing audio tracks. Moreover, these functions can be easily accessed since it is not necessary to open the lid 12 (FIGS. 1–3) or to wait for a boot sequence to run and the operating system to be loaded.

Figure 5:
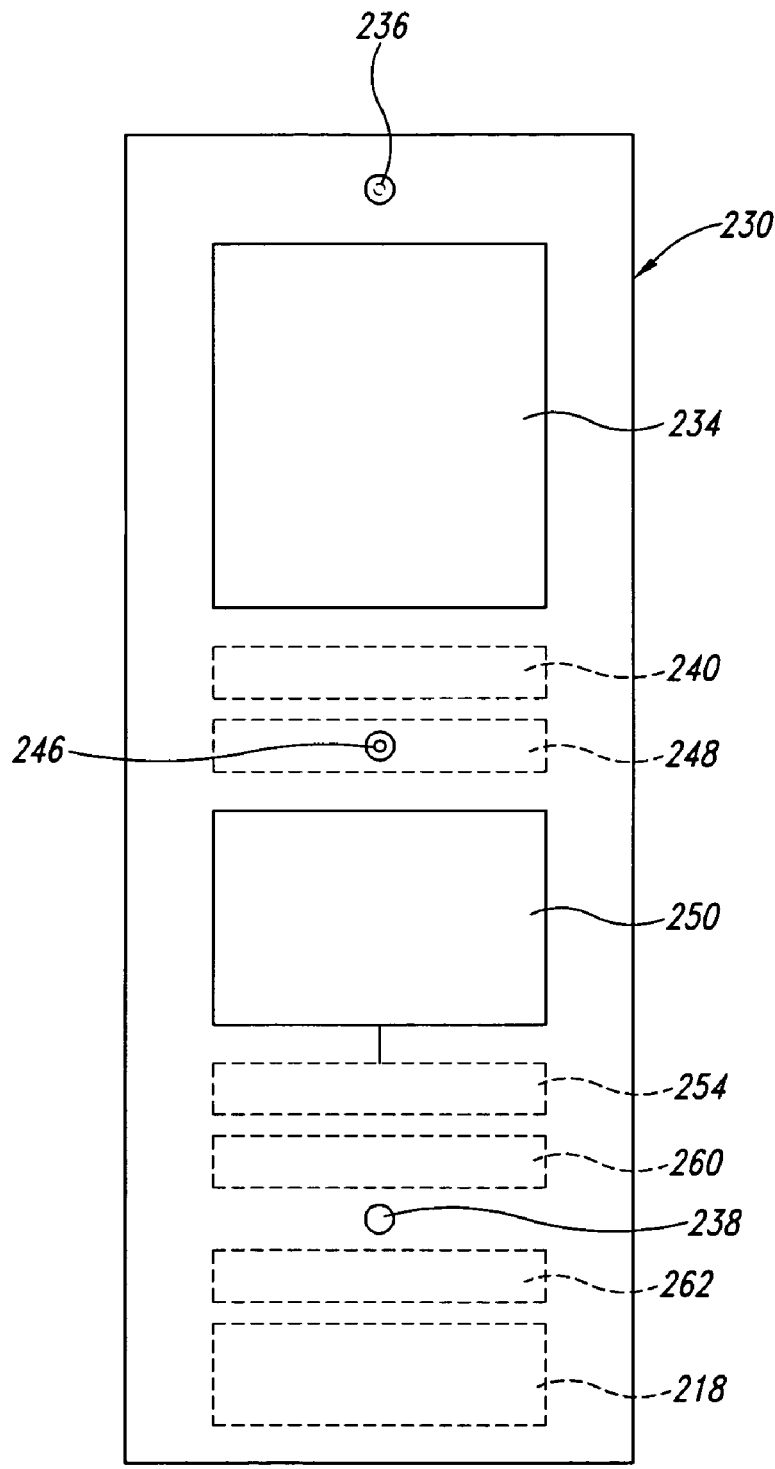
FIG. 5 is a plan view of a module that can be removably received in the computer system of FIG. 1 according to another embodiment.

FIG. 5 is a plan view of another embodiment of a removable module 230 that may be received by the chassis 14 of the computer system 10 in place of the removable module 28 shown in FIGS. 1–3. The removable module 230 includes a touch-screen display 234, a speaker 236 and a microphone 238. Inside the removable module 230 are conventional cellular telephone components 240 powered by the battery 218. The removable module 230 also includes a video camera 246 of conventional design. Coupled to the video camera 240 are conventional video circuitry 248, such as a video signal sampler, which produces analog samples of the video signal from the camera 246, and an analog-to-digital converter for digitizing the samples and passing them to a peripheral bus. The module 230 also includes a fingerprint reader 250 coupled to a conventional fingerprint interface unit 254. A global positioning system ("GPS") sensor 260 is included in the module 230 for providing position information. Finally, the removable module 230 also includes a TV tuner 262 for receiving broadcast television signals. The touch-screen display 234 is also used with the above components. Specifically, in addition to displaying hot keys for use with the cellular telephone components, the display 234 can be used for such purposes as to view video frames being captured by the video camera 246, to view television programming received by the TV tuner 262, and to view position or other related information provided by the GPS sensor 260. The touch-screen display 234 can also display hot keys that can be pressed to control and configure the video camera 240, the fingerprint reader 250, the GPS sensor 260, and the TV tuner 262.

The removable module 230 provides the computer system 10 with significant functionality when it is received by the chassis 14 of the computer system. For example, the cellular telephone components provide the computer system 10 with wireless email and browsing capabilities through a dialup Internet Service Provider or Bluetooth link. The video camera 240 allows the computer system to act as a Web cam for a variety of applications, including video conferencing. Additionally, video and digital photographs obtained using the video camera 240 can be stored in the computer system 10 and later viewed or edited with conventional video and photograph editing applications. The fingerprint reader 250 is used by an application in computer system to disable it from operating unless a fingerprint read by the reader 250 matches a fingerprint profile stored in the chassis 14 of the computer system 10 and/or the removable module 230. The fingerprint reader 250 can also be used to provide authentication of transactions made using the Internet, such as the purchase of goods or services or accessing confidential banking or other records. The GPS sensor 260 can be used by a mapping application to show the position of a user on a map shown on the main display 24. The TV tuner 262 can be used to record TV programming for subsequent viewing. The above are illustrative examples of how the features in the removable module 230 can be used. It will be understood that they can also be used for other functions.

The removable module 230 also has substantial functionality as a stand-alone unit when it is removed from the chassis 14 of the computer system. The module 230 can be used as a conventional cellular telephone for voice communications or with the video camera 240 to provide images during a telephone conversation. The video camera 240 can also be used as a video recorder or as a digital camera. The fingerprint reader 250 can be used to disable the module 230 from operating unless a valid fingerprint has been read by the reader 250. The GPS sensor 260 can be used to provide position information for use by emergency personnel responding to a "911" call so the location of the individual requesting assistance can be easily determined. The TV tuner 262 can be used to view television broadcasts in the display screen 234.

Other embodiments of removable modules for use in the computer system can combine different combinations of the features present in the removable module 28 of FIGS. 1–4 and the removable module 230 of FIG. 5, as well as features developed in the future. By combining desired features in a removable module, the computer system can be provided with the capabilities provided by the module, and the features can be easily used by the module as a stand-alone unit.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

We claim:

1. A computer system, comprising:
 a computer system chassis including hardware and software operable to provide a first predetermined feature; and
 a module removably received by the computer system chassis, the removable module having an internal battery and including hardware and software operable to a provide a second predetermined feature when the module has been removed from the chassis, the module further being operable to interact with the hardware and software in the computer system chassis when the module is received by the computer system chassis to allow the computer system chassis to provide a third predetermined feature that cannot be provided by the computer system chassis when the module has been removed from the chassis, the first predetermined feature being operable by the computer system chassis when the module has been removed from the chassis.

2. The computer system of claim 1 wherein the first predetermined feature provided by the hardware and software in the module comprises at least one of email, appointment calendar, contacts listing, audio player, cellular telephone, video camera, biometric identification, position sensing and TV signal reception features.

3. The computer system of claim 2 wherein the module provides the computer system chassis with at least one of the email, appointment calendar, contacts listing, audio player, cellular telephone, video camera, biometric identification, position sensing and TV signal reception features when the module is received by the computer system chassis.

4. The computer system of claim 1 wherein the computer system chassis further comprises a battery charger coupled to the internal battery in the module, the battery charger being operable to charge the internal battery when the module is received by the computer system chassis.

5. A method of operating a computer system having a removable module, comprising:
 operating the computer system with the removable module attached in the computer system, the removable module causing the computer system to perform a first computing function that cannot be performed by the computer system when the removable module is removed from the computer system;
 removing the module from the computer system and operating the module to provide a second computing function when the module is physically removed from and electrically isolated from the computer system; and
 operating the computer system with the removable module removed from the computer system, the removable module causing the computer system to perform a third computing function.

6. The method of claim 5 wherein the first computing function is substantially the same as the second computing function.

7. The method of claim 5 wherein the second computing function comprises at least one of receiving emails, displaying an appointment calendar, displaying a contacts listing, providing audio content, providing cellular telephone service, obtaining a video image, providing biometric identification information, sensing position and displaying a television picture.

8. The method of claim 5 wherein the module further comprises an internal battery for supplying electrical power to the module when the module has been removed from the computer system, and wherein the method further comprises charging the battery from the computer system when the removable module is in the computer system.

9. The method of claim 5, further comprising:
placing the computer system in a quiescent power saving mode when the module is removed from the computer system; and
automatically transitioning the computer system from the power saving mode to an active normal operating mode when the module is placed in the computer system.

10. An electronic device, comprising:
a module comprising:
a first processor;
a first application running on the first processor;
a first electronic component interacting with the first processor running the first application to provide an operating feature when the module is being used in a stand-alone manner apart from the chassis; and
a battery supplying power to the first processor and the first electronic component; and
a chassis removably receiving the module, the chassis comprising:
a second processor;
a display operatively coupled to the second processor;
a user input device coupled to the second processor;
a second application running on the second processor, the second application interacting with the module when the module is received by the chassis;
a third application running on the second processor, the third application running on the second processor when the module is removed from the chassis; and
a power supply providing electrical power to the second processor and display.

11. The electronic device of claim 10 wherein the chassis further comprises a battery charger coupled to the battery in the module, the battery charger being operable to charge the battery when the module is received by the chassis.

12. The electronic device of claim 10 wherein the first application running on the first processor is also runable on the second processor when the module is received by the chassis.

13. The electronic device of claim 10 wherein the chassis comprises a portable personal computer chassis.

14. The electronic device of claim 10 wherein the chassis is pivotally connected to a lid housing the display, and wherein the module is received in the lid.

15. The electronic device of claim 10 wherein the first application is different from the second application.

16. The electronic device of claim 10 wherein the second processor may be placed in a quiescent power saving mode, and wherein the module is operable to cause the second processor to transition from the power saving mode to an active normal operating mode when the module is received by the chassis.

* * * * *

UNITED STATES PATENT AND TRADEMARK OFFICE
CERTIFICATE OF CORRECTION

PATENT NO.         : 7,222,206 B2                                    Page 1 of 1
APPLICATION NO.    : 10/871872
DATED              : May 22, 2007
INVENTOR(S)        : Martin J. Kee et al.

It is certified that error appears in the above-identified patent and that said Letters Patent is hereby corrected as shown below:

| Column, Line | Reads | Should Read |
|---|---|---|
| Column 2, Line 17 | "to execute and an operating" | --to execute an operating-- |
| Column 3, Line 52 | "hardware system block" | --hardware system block-- |
| Column 4, Line 35 | "moving forwardly or a" | --moving forwardly or-- |
| Column 5, Line 31 | "as well as in internal AC" | --as well as an internal AC-- |
| Column 8, Line 67 | "video camera 240" | --video camera 246-- |
| Column 9, Lines 19, 26-27, 30, 51, 52 | "video camera 240 | --video camera 246-- |

Signed and Sealed this

Fifteenth Day of April, 2008

JON W. DUDAS
*Director of the United States Patent and Trademark Office*